(12) United States Patent
Dubey et al.

(10) Patent No.: US 10,836,306 B1
(45) Date of Patent: Nov. 17, 2020

(54) VEHICLE WITH PORTABLE SIGNATURE LIGHT ASSEMBLY

(71) Applicant: Ford Global Technologies, LLC, Dearborn, MI (US)

(72) Inventors: Prashant Dubey, Canton, MI (US); Segundo Baldovino, Novi, MI (US); Venkatesh Krishnan, Canton, MI (US); LaRon Michelle Brown, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/511,249

(22) Filed: Jul. 15, 2019

(51) Int. Cl.
*B60Q 1/50* (2006.01)
*B60Q 1/28* (2006.01)
*G09F 13/22* (2006.01)
*B60R 13/00* (2006.01)
*B60Q 1/26* (2006.01)
*B60R 16/033* (2006.01)
*G09F 21/04* (2006.01)
*G09F 13/00* (2006.01)

(52) U.S. Cl.
CPC ............ *B60Q 1/50* (2013.01); *B60Q 1/2615* (2013.01); *B60Q 1/28* (2013.01); *B60R 13/005* (2013.01); *B60R 16/033* (2013.01); *G09F 13/22* (2013.01); *G09F 21/048* (2013.01); *G09F 13/005* (2013.01); *G09F 2013/222* (2013.01)

(58) Field of Classification Search
CPC .......... B60Q 1/50; B60Q 1/2615; B60Q 1/28; B60R 16/033; B60R 13/005; G09F 13/22; G09F 21/048
See application file for complete search history.

(56) References Cited

U.S. PATENT DOCUMENTS

| 5,245,943 A * | 9/1993 | Hull ........................ B63C 9/20 116/202 |
| 6,079,858 A | 6/2000 | Hicks |
| 2013/0099698 A1* | 4/2013 | Podd ....................... G09F 21/04 315/297 |
| 2014/0152454 A1* | 6/2014 | Rabin .................... G08B 5/002 340/815.45 |

FOREIGN PATENT DOCUMENTS

| CA | 2661402 A1 | 10/2010 |
| CN | 108082061 A | 5/2018 |
| DE | 10000037 A1 | 7/2001 |

* cited by examiner

*Primary Examiner* — Joseph L Williams
(74) *Attorney, Agent, or Firm* — David Coppiellie; Carlson, Gaskey & Olds, P.C.

(57) ABSTRACT

This disclosure relates to a motor vehicle with a portable signature light assembly, and a corresponding method. In an example, a signature light assembly configured to promote brand recognition of the motor vehicle is operable in a first mode in which the signature light assembly is connected to the motor vehicle and a second mode in which the signature light assembly is removed from the motor vehicle.

19 Claims, 4 Drawing Sheets

VEHICLE WITH PORTABLE SIGNATURE LIGHT ASSEMBLY

TECHNICAL FIELD

This disclosure relates to a motor vehicle with a portable signature light assembly, and a corresponding method.

BACKGROUND

Vehicles may include signature lights arranged and configured to promote brand recognition. For instance, consumers may be able to correctly identify a particular motor vehicle or manufacturer, especially in low light conditions, by viewing the signature lights. Signature lights may resemble a logo, emblem, insignia, or word mark associated with the vehicle or manufacturer. Signature lights may be incorporated into a grille of a vehicle or located elsewhere on a vehicle body.

SUMMARY

A motor vehicle according to an exemplary aspect of the present disclosure includes, among other things, a signature light assembly configured to promote brand recognition of the motor vehicle. The signature light assembly is operable in a first mode in which the signature light assembly is connected to the motor vehicle and a second mode in which the signature light assembly is removed from the motor vehicle.

In a further embodiment of the foregoing motor vehicle, the signature light assembly includes at least one light source and a battery configured to power the at least one light source.

In a further embodiment of any of the foregoing motor vehicles, the signature light assembly includes a cover and a diffuser between the cover and the light source.

In a further embodiment of any of the foregoing motor vehicles, the cover is shaped to promote brand recognition of the motor vehicle.

In a further embodiment of any of the foregoing motor vehicles, the light source includes a plurality of light emitting diodes and a light guide.

In a further embodiment of any of the foregoing motor vehicles, in the first mode, the motor vehicle is configured to charge the battery.

In a further embodiment of any of the foregoing motor vehicles, the signature light assembly includes a secondary battery, and, in the first mode, the motor vehicle is configured to charge the secondary battery.

In a further embodiment of any of the foregoing motor vehicles, in the second mode, the secondary battery is configured to power the at least one light source when the primary battery is depleted.

In a further embodiment of any of the foregoing motor vehicles, the motor vehicle includes a recess configured to receive at least a portion of the signature light assembly in the first mode.

In a further embodiment of any of the foregoing motor vehicles, the recess is formed in a front grille of the motor vehicle.

In a further embodiment of any of the foregoing motor vehicles, mechanical and electrical connectors configured to mechanically and electronically connect the signature light assembly to the motor vehicle are arranged in the recess.

In a further embodiment of any of the foregoing motor vehicles, an electromagnet is arranged adjacent the recess, the signature light assembly includes a permanent magnet, and, when the electromagnet is activated, the electromagnet is configured to mechanically connect the signature light assembly to the motor vehicle and hold the signature light assembly relative to the motor vehicle in the first mode.

In a further embodiment of any of the foregoing motor vehicles, the electromagnet is configured to selectively permit removal of the signature light assembly from the recess.

In a further embodiment of any of the foregoing motor vehicles, electrical contacts are arranged in the recess, the signature light assembly includes electrical contacts electronically connected with the battery of the signature light assembly, and in the first mode, the motor vehicle is configured to electronically connect to the signature light assembly via the electrical contacts of the recess and the signature light assembly.

In a further embodiment of any of the foregoing motor vehicles, the signature light assembly is configured in the form of a logo to promote brand recognition of the vehicle.

In a further embodiment of any of the foregoing motor vehicles, the signature light assembly includes a plurality of signature light subassemblies, and each of the signature light subassemblies is configured in the form of a portion of a logo such that when the signature light subassemblies are in the first mode the signature light subassemblies collectively resemble a complete logo.

A motor vehicle according to another exemplary aspect of the present disclosure includes a body with a recess and a signature light assembly according any one or more of the foregoing paragraphs. The signature light assembly is operable in a first mode in which the signature light assembly is at least partially received in the recess and a second mode in which the signature light assembly is removed from the motor vehicle.

A method according to an exemplary aspect of the present disclosure includes, among other things, removing a signature light assembly configured to promote brand recognition from a motor vehicle to provide a portable light.

In a further embodiment of the foregoing method, the method includes attaching and holding the signature light assembly relative to the motor vehicle using an electromagnet.

In a further embodiment of the foregoing method, the method includes, when the signature light assembly is removed from the motor vehicle, powering the light with a secondary battery upon depletion of a primary battery.

BRIEF DESCRIPTION OF THE DRAWINGS

In FIG. 1, the signature light assembly is operable in a first mode in which the signature light assembly is attached to the motor vehicle.

In FIG. 2, the signature light assembly is operable in a second mode in which the signature light assembly has been detached from the motor vehicle.

DETAILED DESCRIPTION

This disclosure relates to a motor vehicle with a portable signature light assembly, and a corresponding method. In an example, a signature light assembly configured to promote brand recognition of the motor vehicle is operable in a first mode in which the signature light assembly is connected to the motor vehicle and a second mode in which the signature light assembly is removed from the motor vehicle. This arrangement permits one to use the signature light assembly as a portable light, which is particularly useful in camping, hiking, and other outdoor applications. These and other benefits will be appreciated from the below description.

Figure 1:
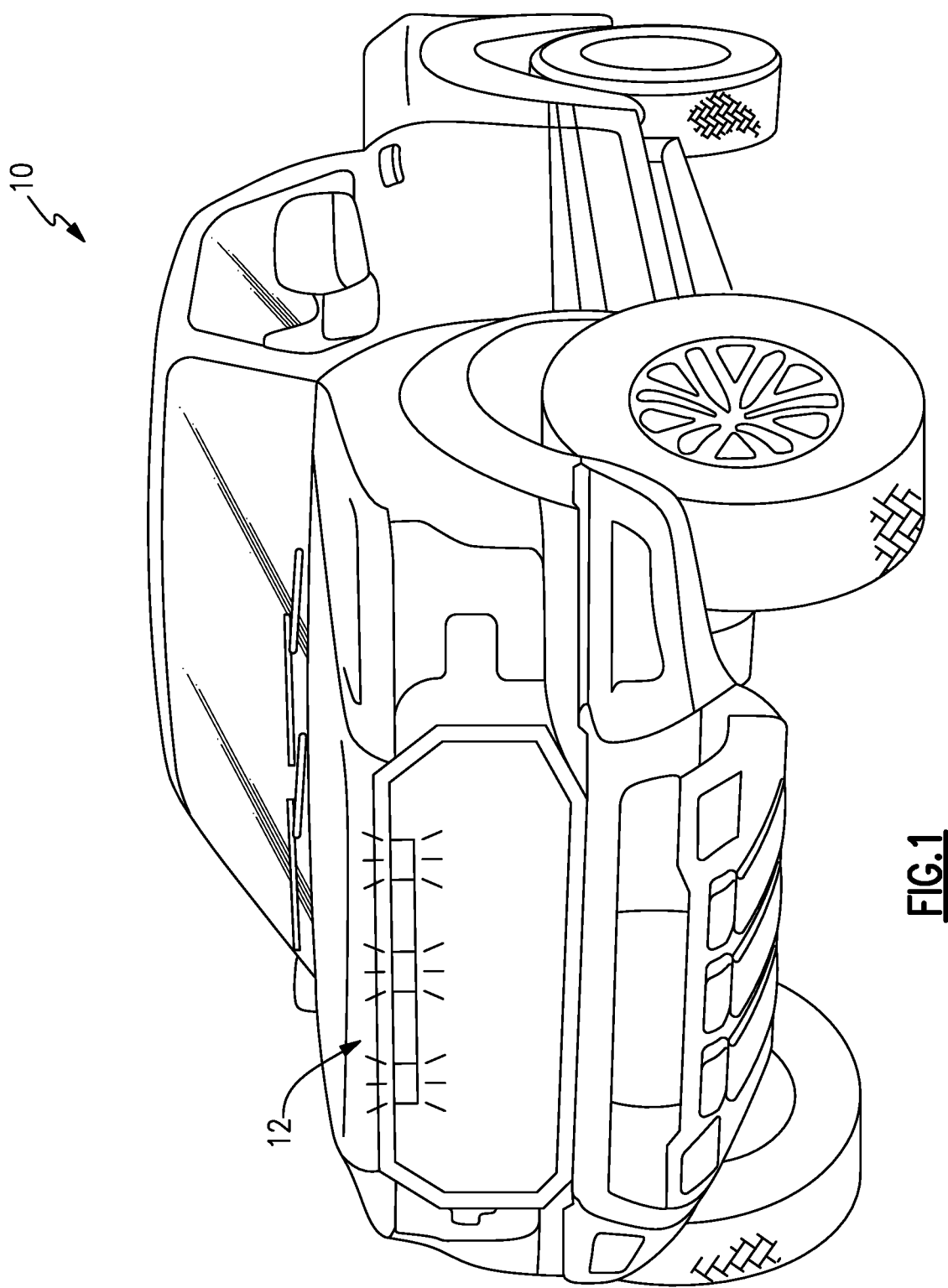
FIG. 1 is a front perspective view of a motor vehicle with an example signature light assembly.

FIG. 1 illustrates a motor vehicle 10 including a portable signature light assembly 12. The signature light assembly 12 is configured to promote brand recognition such that consumers may be able to correctly identify a particular motor vehicle or manufacturer, especially in low light conditions, just by viewing the signature light assembly 12. In this regard, the signature light assembly 12 does not merely perform the functions of a conspicuity light or signal light, for example, but alternatively or additionally promotes brand recognition. The signature light assembly 12 may resemble a logo, emblem, insignia, or word mark associated with the vehicle or manufacturer. For instance, in one example, the vehicle 10 may be a Ford F-150 Raptor, and the signature light assembly 12 is arranged in a distinct pattern including three lights arranged near a top of a grille of the vehicle 10 which consumers associate with Ford Motor Company and/or the F-150 Raptor. The signature light assembly 12 may be configured to identify other vehicles, and is not limited to any particular manufacturer, make, or model.

In this disclosure, the signature light assembly 12 is operable in at least two modes. FIG. 1 is representative of the signature light assembly 12 being operable in a first mode in which the signature light assembly 12 is connected to the vehicle 10. The signature light assembly 12 may be operable in the first mode regardless of whether the engine of the vehicle 10 is on or off.

Figure 2:
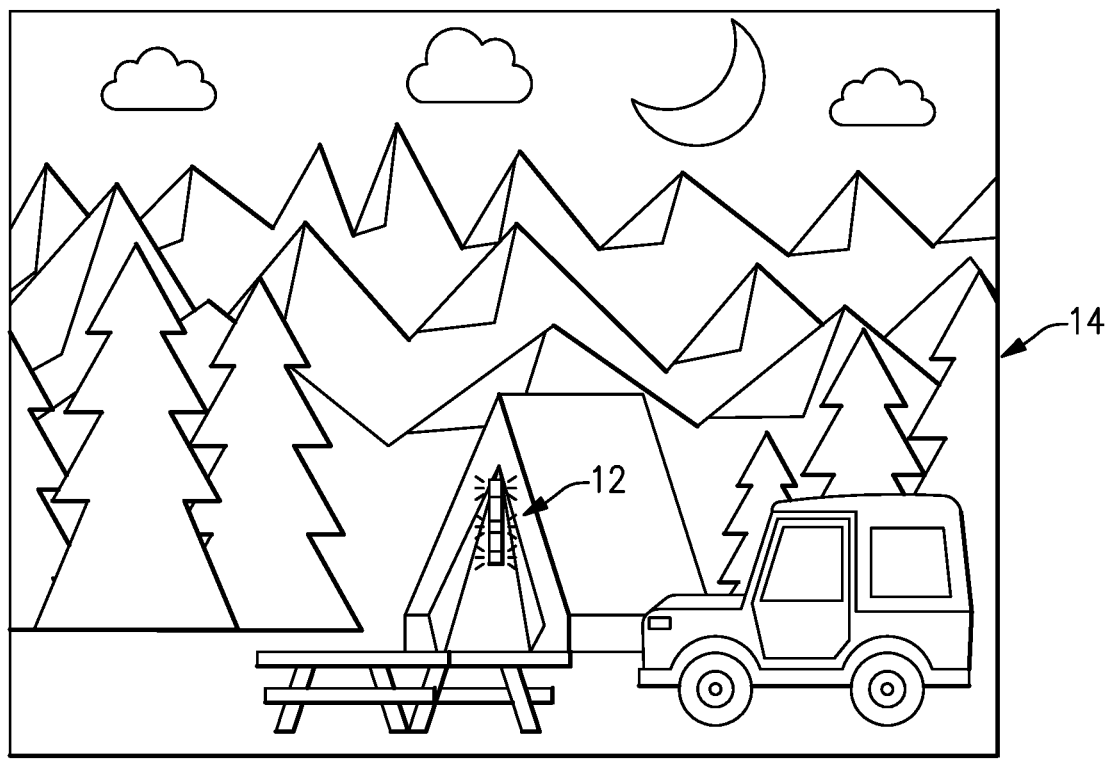
FIG. 2 illustrates the signature light assembly illuminating a campsite.

FIG. 2 is representative of the signature light assembly 12 operable in a second mode in which the signature light assembly 12 is removed from the vehicle 10. In FIG. 2, a user has detached the signature light assembly 12 from the vehicle 10 and is using the signature light assembly 12 to illuminate a campsite 14. The signature light assembly 12 is portable and battery-powered, and thus may be used for a variety of purposes other than functioning as a signature light assembly for a vehicle. For instance, the signature light assembly 12 can be used to illuminate a hiking trail, a work area, etc.

Figure 3:
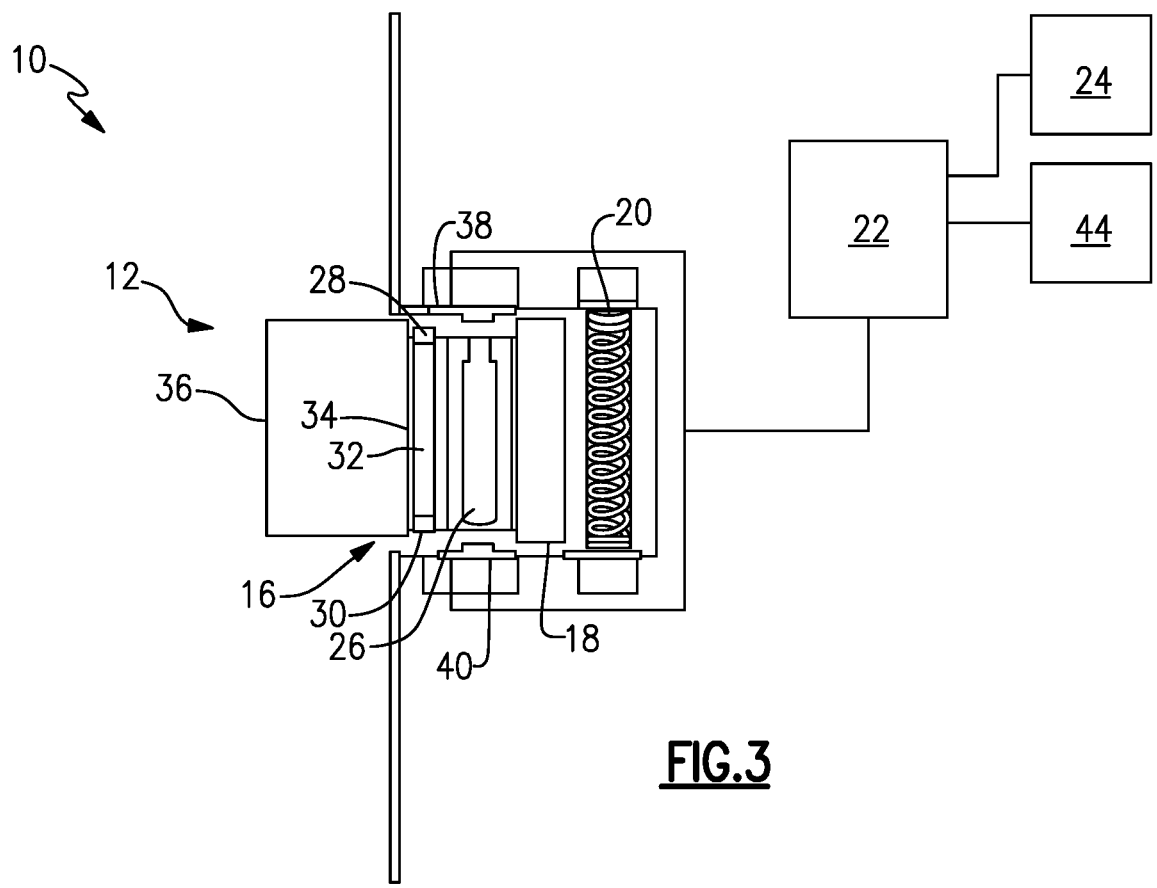
FIG. 3 is a schematic, cross-sectional view of a portion of the signature light assembly relative to a vehicle.

FIG. 3 is a cross-sectional, schematic view illustrating an exemplary arrangement of the vehicle 10 and the signature light assembly 12 in the first mode (i.e., where the signature light assembly 12 is attached to the vehicle 10). In general, the vehicle 10 includes a recess 16 configured to receive at least a portion of the signature light assembly 12 when the signature light assembly 12 is in the first mode. The signature light assembly 12 is configured to mechanically and electrically connect to the vehicle 10 via the recess 16. The recess 16 is formed in a front grille of the vehicle 10, in this example, but could be located elsewhere on the body of the vehicle 10.

In this disclosure, the signature light assembly 12 is configured to mechanically connect to the vehicle 10 via at least a magnetic connection. In particular, the signature light assembly 12 includes a permanent magnet 18 and an electromagnet 20 is arranged adjacent the recess 16. The electromagnet 20 is electronically connected to a controller 22, which is configured to selectively direct current from a power source 24 of the vehicle 10 through the electromagnet 20 to activate the electromagnet 20 such that it produces a magnetic field which attracts the permanent magnet 18 and holds the signature light assembly 12 in the recess 16. In a particular example, the electromagnet 20 produces a 100 N axial force on the permanent magnet 18, which substantially prevents unintended removal of the signature light assembly 12 and substantially prevents theft. The electromagnet 20 may produce a magnetic field of about 1500 gauss (B) in one example. The electromagnet 20 may be deactivated by a pulse, such as a 0.12 Amp pulse, in one example.

The controller 22 is configured to receive information from the various components of the vehicle 10 and is configured to interpret that information and issue commands the components of the vehicle 10 based on that information. The controller 22 is shown schematically in FIG. 3. It should be understood that the controller 22 may include hardware and software, and could be part of an overall vehicle control module, such as a body control module (BCM) or vehicle system controller (VSC), or could alternatively be a stand-alone controller separate from the BCM or VSC. Further, the controller 22 may be programmed with executable instructions for interfacing with and operating the various components of the vehicle 10. The controller 22 additionally includes a processing unit and non-transitory memory for executing the various control strategies and modes of the vehicle system.

The signature light assembly 12 further includes at least one battery 26 configured to power at least one light source. In this example, the signature light assembly 12 includes a first light source 28 and a second light source 30 arranged on opposite vertical sides of a light guide 32. The first and second light sources 28, 30 may be light emitting diodes (LEDs), and may further be single colored or multi-colored LEDs, the latter of which are configured to selectively emit light in more than one color based on a command from the controller 22. The light guide 32 may be a light tube or another type of optical element configured to direct light outwardly from the first and second light sources 28, 30. The signature light assembly 12 further includes a diffuser 34 configured to diffuse light from the light guide 32, and a cover 36.

The cover 36 is shaped to promote brand recognition of the vehicle 10. For instance, the cover 36 may be formed in the shape of a logo, or the like, representing a manufacturer or model of the vehicle 10. The cover 36 may be made of a clear plastic material in one example. The cover 36 may be an elongate strip of material having a main body section and with certain other sections projecting in a forward direction from the main body section to define the logo, for instance.

The battery 26 is electronically connected to the power source of the vehicle 24 via electrical contacts 38, 40 arranged in the recess 16. The signature light assembly 12 includes electrical contacts configured to electronically connect to the electrical contacts 38, 40 when the signature light assembly 12 is in the first mode. The controller 22 is configured to direct current to the battery 26 to charge the battery 26 when needed. In this respect, the controller 22 is also configured to determine the state of charge (SOC) of the battery 26. The controller 22 may be configured to charge the battery 26 when the vehicle 10 is on or when the vehicle 10 is off. Further, the controller 22 may be configured to power the first and second light sources 28, 30 directly by bypassing the battery 26 when the signature light assembly 12 is in the first mode. The battery 26 is configured to power the signature light assembly 12 in the second mode.

Figure 4:
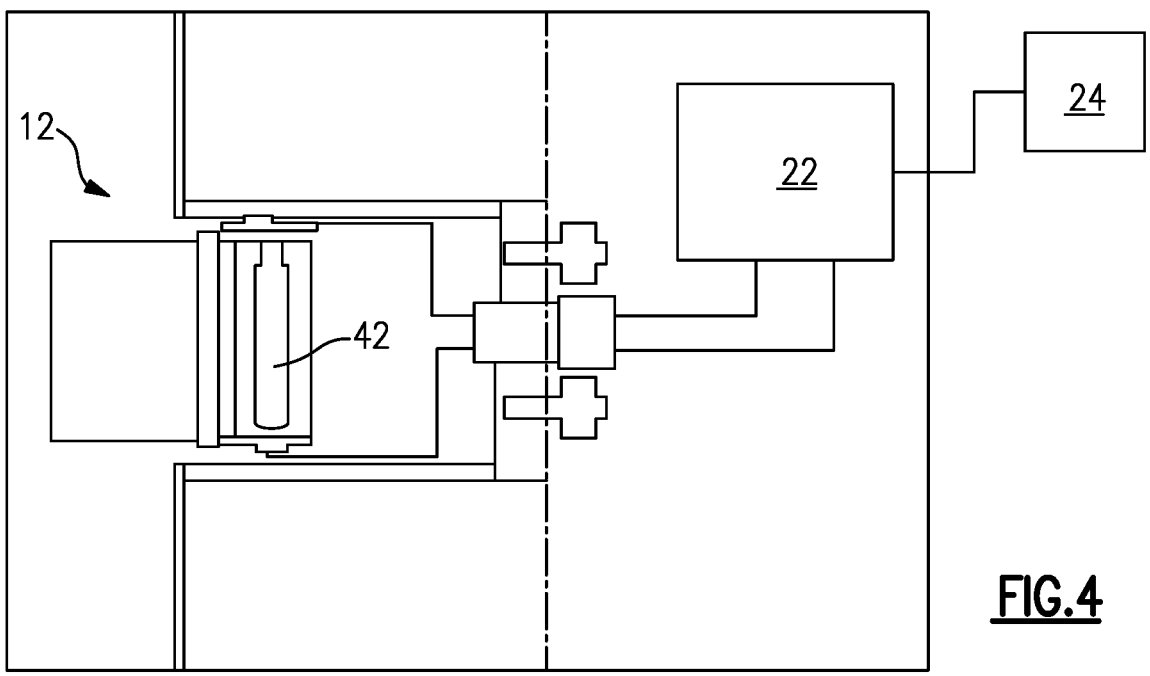
FIG. 4 is a schematic, cross-sectional view of another portion of the signature light assembly relative to a vehicle.
Figure 5:
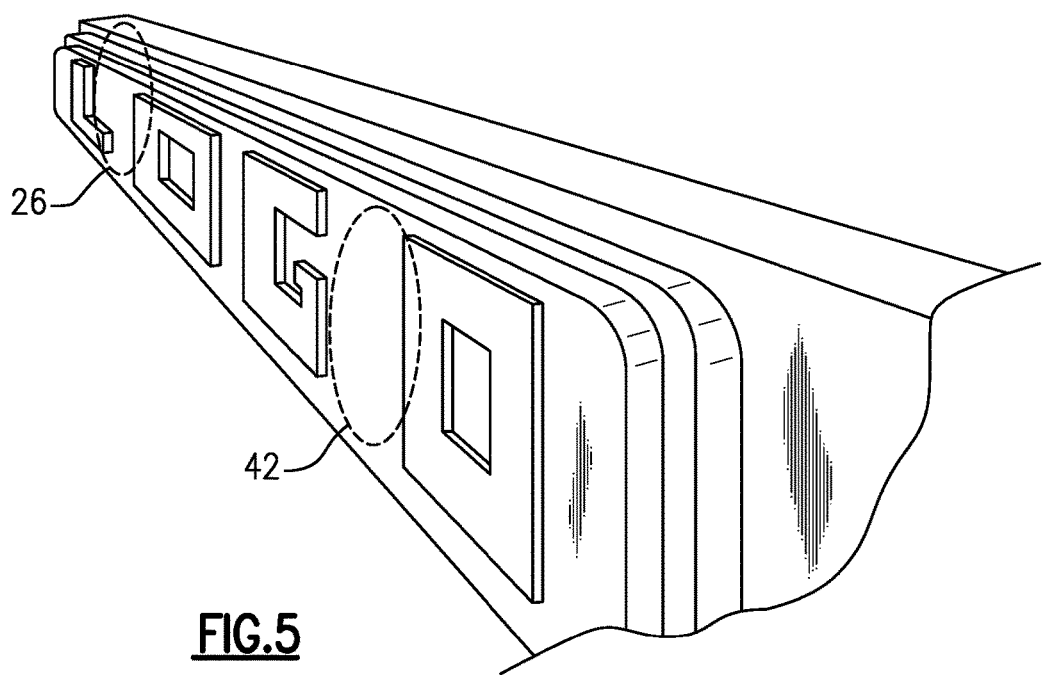
FIG. 5 is a perspective view of an example signature light assembly.

In addition to the battery 26, the signature light assembly 12 may include a secondary, backup battery 42, as shown in FIG. 4. The backup battery 42 may be spaced-apart from the battery 26 along a length of the signature light assembly 12. FIG. 5 generally represents the locations of the battery 26 and the backup battery 42 relative to an example signature light assembly 12. The controller 22 is configured to electronically connect the backup battery 42 to the power source 24 of the vehicle 10 and to selectively charge the backup battery 42. The controller 22 may be programmed to prioritize charging of the battery 26, followed by charging the backup battery 42 once the battery 26 is fully charged. The controller 22 may also be configured to trickle charge the battery 26 and backup battery 42 to keep both batteries fully charged.

The signature light assembly 12 may include a printed circuit board (PCB), for example, configured to selectively direct power from either the battery 26 or the backup battery 42 to the first and second light sources 28, 30 depending on the relative states of charge (SOCs) of the batteries 26, 42. Alternatively, the signature light assembly 12 may be configured such that the user may replace the battery 26 with the backup battery 42 when the battery 26 is depleted. In a further aspect of this disclosure, the backup battery 42 is not removable from the vehicle 10 with the signature light assembly 12, but a user may detach the backup battery 42 when needed, and swap the battery 26 for the backup battery 42 such that the backup battery 42 powers the first and second light sources 28, 30 and the battery 26 is charged by the power source 24 of the vehicle 10.

With reference to FIG. 3, in order to detach the signature light assembly 12 and use the signature light assembly 12 in the second mode, the electromagnet 20 is deactivated. In one example, the vehicle 10 includes a transceiver 44 electronically connected with the controller 22. The transceiver 44 is configured to receive a signal indicative of the user's desire to detach the signature light assembly 12. The signal may be sent from a keyfob, an app on a mobile device (including a phone, smart watch, etc.) of a user, or a biometric input, for example. The vehicle 10 may also include a physical button or a button on a human-machine interface (i.e., touchscreen) permitting the user to indicate a desire to detach the signature light assembly 12. In response to such a signal, the controller 22 is configured to deactivate the electromagnet 20 such that the user can remove the signature light assembly 12 and operate it in the second mode.

In response to a signal indicative of a desire to remove the signature light assembly 12, in one example the electromagnet 20 is not completely deactivated. Rather, the electromagnet 20 produces a relatively low magnetic force which permits easy removal of the signature light assembly 12 by the user, while also preventing the signature light assembly 12 from falling out of the recess prematurely.

In the second mode, the signature light assembly 12 may emit light for around 6 hours. The signature light assembly 12 may emit light for even more time depending on whether a backup battery is used. The signature light assembly 12 is configured to emit light having a luminous intensity of about 250 candelas in one example.

The signature light assembly 12 may itself include a transceiver configured to generate a signal indicating that one or more of the batteries 26, 42 is low and in need of replacement. The signal may be sent to a mobile device of the user, for example. The signature light assembly 12 may also include an accelerometer to count steps while a user is hiking, for example.

Figure 6:
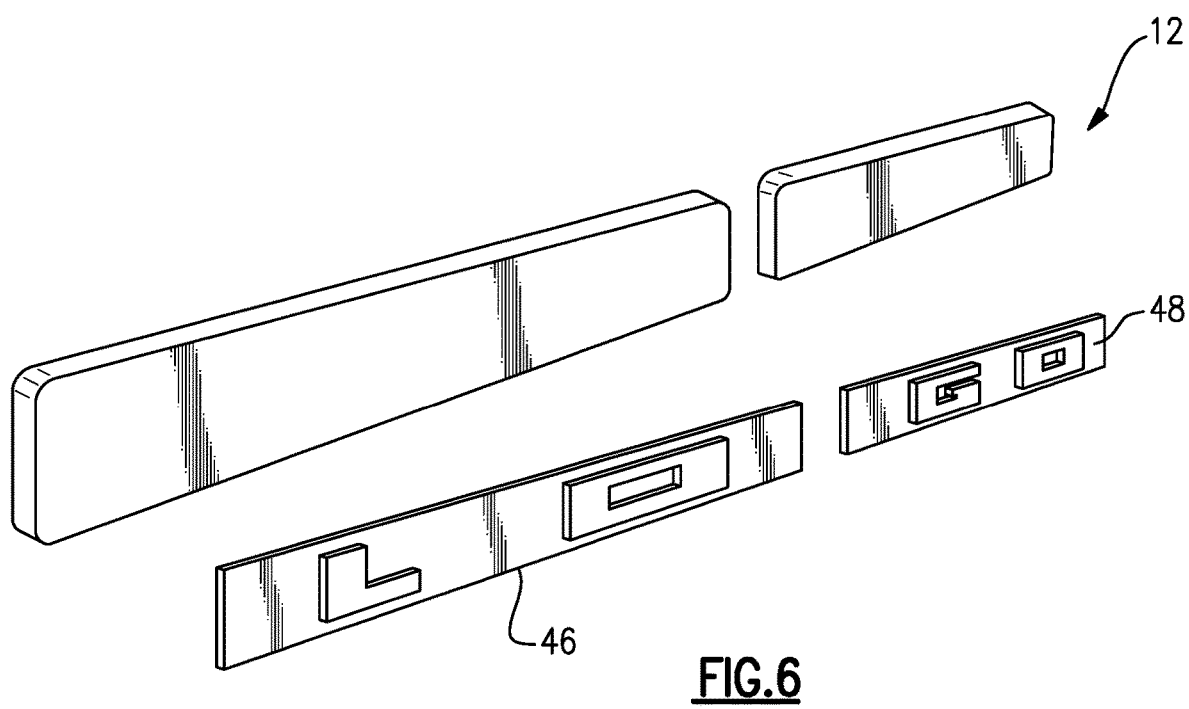
FIG. 6 is a perspective view of another example signature light assembly.

The signature light assembly 12 could include one or more subassemblies. For instance, in FIG. 6, the signature light assembly 12 includes two signature light subassemblies 46, 48. Each of the signature light subassemblies 46, 48 may be configured substantially the same way as the signature light assembly 12 of FIG. 3. Each of the signature light subassemblies 46, 48 is configured in the form of a portion of a logo such that when the signature lights subassemblies 46, 48 are in the first mode the signature light subassemblies 46, 48 collectively resemble a complete logo. The user may selectively detach one or both of the signature light subassemblies 46, 48 to operate them in the second mode, as desired. In another embodiment, the signature light assembly 12 could form a portion of or substantially an entirety of a front grille of the vehicle 10.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a signature light assembly configured to promote brand recognition of the motor vehicle, wherein the signature light assembly is operable in a first mode in which the signature light assembly is connected to the motor vehicle and a second mode in which the signature light assembly is removed from the motor vehicle,
wherein the signature light assembly includes at least one light source, a primary battery configured to power the at least one light source, and a secondary battery,
wherein, in the second mode, the secondary battery is configured to power the at least one light source when the primary battery is depleted.

2. The motor vehicle as recited in claim 1, wherein the signature light assembly includes a cover and a diffuser between the cover and the light source.

3. The motor vehicle as recited in claim 2, wherein the cover is shaped to promote brand recognition of the motor vehicle.

4. The motor vehicle as recited in claim 1, wherein the light source includes a plurality of light emitting diodes and a light guide.

5. The motor vehicle as recited in claim 1, wherein, in the first mode, the motor vehicle is configured to charge the primary battery and the secondary battery.

6. The motor vehicle as recited in claim 5, wherein the motor vehicle includes a recess configured to receive at least a portion of the signature light assembly in the first mode.

7. The motor vehicle as recited in claim 6, wherein the recess is formed in a front grille of the motor vehicle.

8. The motor vehicle as recited in claim 6, wherein mechanical and electrical connectors configured to mechanically and electronically connect the signature light assembly to the motor vehicle are arranged in the recess.

9. The motor vehicle as recited in claim 8, wherein:
an electromagnet is arranged adjacent the recess,
the signature light assembly includes a permanent magnet, and
when the electromagnet is activated, the electromagnet is configured to mechanically connect the signature light assembly to the motor vehicle and hold the signature light assembly relative to the motor vehicle in the first mode.

10. The motor vehicle as recited in claim 9, wherein the electromagnet is configured to selectively permit removal of the signature light assembly from the recess.

11. The motor vehicle as recited in claim 8, wherein:
electrical contacts are arranged in the recess,
the signature light assembly includes electrical contacts electronically connected with the primary battery of the signature light assembly, and
in the first mode, the motor vehicle is configured to electronically connect to the signature light assembly via the electrical contacts of the recess and the signature light assembly.

12. The motor vehicle as recited in claim 1, wherein the signature light assembly is configured in the form of a logo to promote brand recognition of the vehicle.

13. The motor vehicle as recited in claim 1, wherein:
the signature light assembly includes a plurality of signature light subassemblies, and
each of the signature light subassemblies is configured in the form of a portion of a logo such that when the signature light subassemblies are in the first mode the signature light subassemblies collectively resemble a complete logo.

14. The motor vehicle as recited in claim 1, wherein the signature light assembly includes a transceiver and, in the second mode, the transceiver is configured to send a signal indicative of the state of charge of one or both of the primary battery and the secondary battery.

15. The motor vehicle as recited in claim 1, wherein the signature light assembly includes an accelerometer configured to generate a signal used to count a number of steps a user takes in the second mode.

16. A motor vehicle, comprising:
a body including a recess; and
a signature light assembly configured to promote brand recognition of the motor vehicle, wherein the signature light assembly is operable in a first mode in which the signature light assembly is at least partially received in the recess and a second mode in which the signature light assembly is removed from the motor vehicle, wherein the signature light assembly includes at least one light source, a battery configured to power the at least one light source, a transceiver, a cover, and a diffuser between the cover and the at least one light source, wherein the cover is shaped to promote brand recognition of the motor vehicle, wherein, in the first mode, the motor vehicle is configured to charge the battery, and wherein, in the second mode, the transceiver is configured to send a signal indicative of the state of charge of the battery;
wherein an electromagnet is arranged adjacent the recess, the signature light assembly includes a permanent magnet, and, when the electromagnet is activated, the electromagnet is configured to mechanically connect the signature light assembly to the motor vehicle and hold the signature light assembly relative to the motor vehicle in the first mode, and wherein the electromagnet is configured to selectively permit removal of the signature light assembly from the recess, and
wherein electrical contacts are arranged in the recess, the signature light assembly includes electrical contacts electronically connected with the battery of the signature light assembly, and, in the first mode, the motor vehicle is configured to electronically connect to the signature light assembly via the electrical contacts of the recess and the signature light assembly.

17. A method, comprising:
removing a signature light assembly configured to promote brand recognition from a motor vehicle to provide a portable light; and
when the signature light assembly is removed from the motor vehicle, powering the light with a secondary battery upon depletion of a primary battery.

18. The method as recited in claim 17, further comprising:
attaching and holding the signature light assembly relative to the motor vehicle using an electromagnet.

19. The method as recited in claim 17, further comprising:
when the signature light assembly is removed from the motor vehicle, using a transceiver to send a signal indicative of the state of charge of one or both of the primary battery and the secondary battery.

* * * * *